April 15, 1958  A. H. BROWN  2,831,171
ECHO BOX HAVING CONSTANT TRANSIENT DECAY TIME
Filed Feb. 21, 1946
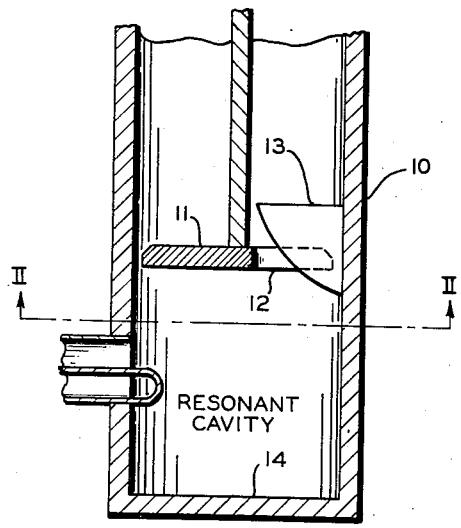
FIG. I
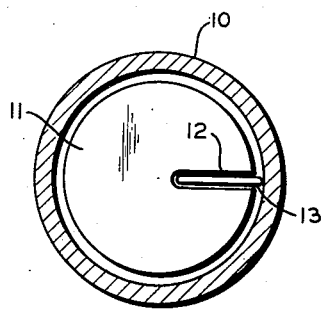
FIG. 2
INVENTOR.
ALLAN HARVEY BROWN
BY
ATTORNEY United States Patent Office 2,831,171
Patented Apr. 15, 1958

2,831,171
ECHO BOX HAVING CONSTANT TRANSIENT DECAY TIME

Allan Harvey Brown, Hyattsville, Md., assignor, by mesne assignments, to the United States of America as represented by the Secretary of the Navy Application February 21, 1946, Serial No. 649,421

3 Claims. (Cl. 333—83)

The present invention relates to testing apparatus and more particularly to apparatus for use in determining the overall effectiveness of radar systems.

Such testing apparatus more commonly referred to as an "echo box" uses a resonant chamber which builds up an internal electro-magnetic field during receipt of a pulse of oscillations from the transmitter of the radar system. When the pulse from the transmitter ceases, the the "echo box" returns oscillations of the same frequency to the receiver of the radar system for a period designated as the "ringtime" of the resonant chamber. One difficulty which has been encountered in the use of the echo box as a measuring stick of the overall efficiency of a radar system is the frequency sensitivity of the echo box ringtime. Echo boxes have been found to ring longer at the longer wavelengths.

Accordingly, it is an object of this invention to decrease the frequency sensitivity of echo box ringtime.

Another object of this invention is to provide an echo box for testing radar systems having predetermined limits of frequency which will yield a ringtime of substantially the same duration for oscillations of any frequency within the predetermined limits.

These and further objects will become apparent upon consideration of the following description and the accompanying drawings, of which:

Fig. 1 is a plan view of an embodiment of this invention; and

Fig. 2 is a sectional view taken at section line II—II of Fig. 1.

A mechanical obstacle is inserted into a cavity having a moving plunger so as to reduce the Q, or quality factor, of the cavity at the longer wavelength end of the tuning range. The obstacle may assume various shapes and orientations and more than one obstacle may be used. Experimentation has shown that obstacle size and position may be changed to get the desired amount of ringtime compensation. Insertion into the resonant chamber can be achieved if the obstacle is movable and attached to the echo box tuning mechanism in an appropriate fashion such that the obstacle is inserted farther into the cavity for lower frequency settings of the tuning mechanism. The obstacle may also be fixed in position and its insertion into the cavity accomplished automatically as the moving plunger is withdrawn by tuning to lower frequencies. The obstacle is fastened to the cavity or housing and protrudes through a slot or hole in the movable plunger.

A cylindrical resonant cavity 10 as shown in the drawing has within it a movable plunger 11 which has a radial slot 12 cut in it. A vane obstacle 13 is longitudinally attached to cavity 10 in such a manner that slot 12 allows movable plunger 11 to clear vane 13 in its movement along the longitudinal axis of cavity 10. The operational features of this embodiment are based on the use of the $TE_{01}$ mode which exhibits the frequency sensitivity previously mentioned. Thus as plunger 11 is moved away from end-plate 14 of cavity 10 the resonant frequency of the cavity is lowered and ringtime is greater. Obstacle 13 is given an empirically-determined shape which effectively reduces the Q of cavity 10 as plunger 11 moves out in such fashion that the decreased Q compensates for the longer ringtime associated with the longer wavelengths. The shape of the obstacle may be concave or convex depending on the requirements of the particular mode and cavity design. The net effect of such insertion is a relatively flat "ringtime versus frequency" characteristic.

The principles of this invention are of broader application in ways which will be apparent to those skilled in the art. It will be understood that the above-disclosed embodiment is primarily illustrative and that the invention includes such other embodiments as fairly come within the spirit and scope of the appended claims.

What is claimed is:

1. In combination a cylindrical chamber having an end plate, a slotted plunger slidably mounted within said chamber, a tapered conductive member secured to the inside wall of said chamber, said member lying in a plane including the longitudinal axis of said chamber and disposed with its narrow portion directed towards said end plate, the slot in said plunger and said tapered member being in alignment whereby longitudinal movement of said plunger results in increasing amounts of said conductive member being inserted in the cavity resonator formed by said chamber, said end plate, and said plunger.

2. In combination, a hollow cylindrical member closed at one end, a plunger mounted within said member and co-operating therewith to form a cavity resonator the resonant frequency of which is determined in part by the distance between said end and said plunger, a radial slot cut in the face of said plunger, a conductive plate secured to the inside wall of said member and disposed in a plane including the longitudinal axis of said member, said plate having an increasing width such that the Q of the resonant cavity is varied as said plunger is moved away from said one end, whereby said cavity resonator possesses a substantially constant ring time when excited at different frequencies.

3. A hollow cylindrical chamber having one of its ends closed, a plunger slidably mounted within said chamber so as to effectively close the other end of said chamber and form a tunable cavity resonator, a radial slot cut in said plunger, a conductive plate secured to the inner wall of said chamber such that longtudinal movement of said plunger results in increasing areas of said conductive plate being disposed in the cavity resonator, the contour of said plate being such that the Q of the cavity resonator varies inversely with the resonant frequency thereof so that a constant ringing time is obtained when said cavity resonator is excited at different frequencies.

References Cited in the file of this patent
UNITED STATES PATENTS

| | | |
|---|---|---|
| 2,253,503 | Bowen | Aug. 26, 1941 |
| 2,306,282 | Samuel | Dec. 22, 1942 |
| 2,406,402 | Ring | Aug. 27, 1946 |
| 2,411,424 | Gurewitsch | Nov. 19, 1946 |
| 2,415,242 | Hershberger | Feb. 4, 1947 |
| 2,417,542 | Carter | Mar. 18, 1947 |
| 2,465,639 | Edson | Mar. 29, 1949 |